(12) United States Patent
Wakitani et al.

(10) Patent No.: US 6,188,152 B1
(45) Date of Patent: Feb. 13, 2001

(54) MOTOR AND HARD DISK DRIVE HAVING A REDUCED VIBRATION MOTOR

(75) Inventors: Akihiko Wakitani; Takao Yoshitsugu; Shoichi Yoshikawa; Akihide Matsuo; Hideshi Fukutani, all of Yonago (JP)

(73) Assignee: Matsushita Electric Industrial Co., Ltd. (JP)

( * ) Notice: Under 35 U.S.C. 154(b), the term of this patent shall be extended for 0 days.

(21) Appl. No.: 09/272,579

(22) Filed: Mar. 19, 1999

(30) Foreign Application Priority Data

Mar. 26, 1998 (JP) .................................................. 10-078172

(51) Int. Cl.$^7$ ................................. H02K 5/24; H02K 1/22
(52) U.S. Cl. ............................................... 310/51; 310/261
(58) Field of Search ................................... 310/67 R, 51, 310/261; 74/574

(56) References Cited

U.S. PATENT DOCUMENTS

| | | | |
|---|---|---|---|
| 4,739,427 | 4/1988 | Kilmer et al. | 360/98.08 |
| 5,598,047 * | 1/1997 | Sakuragi et al. | 310/67 R |
| 5,623,382 * | 4/1997 | Moritan et al. | 360/99.08 |
| 5,647,672 * | 7/1997 | Fukutani | 384/100 |

\* cited by examiner

*Primary Examiner*—Nestor Ramirez
*Assistant Examiner*—Guillermo Perez
(74) *Attorney, Agent, or Firm*—Parkhurst & Wendell, L.L.P.

(57) ABSTRACT

It is an object of the present invention to provide a motor capable of reducing a loss as much as possible, and securing minimum vibration proof performance and reliability by definitely defining the upper and lower limits of a minimum shaft diameter in conformity with a disk load, the service number of revolutions or the like. In a shaft-fixed type motor of the fluid bearing specifications, the diameter d (mm) of a fixed shaft is set so as to satisfy the relation of $\alpha^3 \cdot M1 > d^3 > M1$, where $M1 = J1 \cdot (N/1000)^2 \cdot k^2 \cdot D$, J1 being a coefficient to be experimentally determined, N(rpm) the service number of revolutions, k the number of a disk-shaped recording media, D (inch) the diameter of the disk-shaped recording medium, and $\alpha$ a ratio of the maximum diameter to the minimum diameter of the fixed shaft.

5 Claims, 11 Drawing Sheets

MOTOR AND HARD DISK DRIVE HAVING A REDUCED VIBRATION MOTOR

FIELD OF THE INVENTION

The present invention relates to a motor for use with an OA apparatus or an AV apparatus.

BACKGROUND OF THE INVENTION

In a hard disk drive for reading magnetic recording or content of record while rotating a hard disk at high speed, there is used a shaft-rotating type motor or such a shaft-fixed type motor as disclosed in U.S. Pat. No. 4,739,427.

The shaft-fixed type motor has, as shown in FIG. 15, a magnet 4 provided for a rotor 3 rotatably supported by a fixed shaft 1a through ball bearings 2a and 2b, and a stator winding 6 mounted on a stator core 5 so as to face the magnet 4, for rotationally driving hard disks 7 placed on the rotor 3 around the shaft center thereof.

Generally, the vibration proof characteristic has the following tendency:

When the number of revolutions increases, the vibration proof characteristic is deteriorated, and the vibration proof characteristic is also deteriorated even when a disk load is increased.

Naturally, this vibration proof characteristic will be improved if a motor resonance point is improved. Therefore, as described above, there is generally adopted a both ends supported structure in which a proximal end of the fixed shaft 1a is fixed to a lower case 8a and a tip end portion is fixed to an upper case 8b with a machine screw 9 to improve the resonance point, or in a cantilever supporting structure, a shaft diameter is generally made large.

DISCLOSURE OF THE INVENTION

The conventional vibration proof characteristics have not posed any significant problems regarding ball bearing specifications for the following reasons:

In the ball bearing specifications, there is a small relation between the shaft diameter and current consumption because of rolling friction, and therefore, the shaft diameter a can be made large for use. Also, a shaft with a diameter of 5 mm or 6 mm has been used, and ball bearings of this class are low-priced, but there is a problem that the ball bearing becomes difficult to resist a shock because the resistance to load capability becomes low when the size of the ball bearing becomes small.

When great importance is attached on compactization and resistance to shock load, the support by fluid bearing in place of ball bearings is advantageous, and the specific structure is described in U.S. Pat. No. 5,590,003.

Hereinafter, the fluid bearing specifications will be studied.

Regarding the fluid bearing specifications, heretofore, we have been anxious to solve the maximum problem, i.e., how an increase in loss caused by fluid friction should be restricted. For this reason, it is most effective to reduce the shaft diameter and peripheral speed, and it is important to deal with the matter by the minimum shaft diameter in accordance with a disk load, the number of revolutions or the like.

It is an object of the present invention to provide a motor capable of reducing the loss as far as possible, and securing the minimum vibration proof performance and reliability by definitely defining the upper and lower limits for the minimum shaft diameter in conformity with the disk load, the service number of revolutions or the like in the fluid bearing specifications, and a hard disk drive loaded with this motor.

According to a motor of the present invention, there is provided a shaft-fixed type motor of the fluid bearing specifications, wherein the diameter d (mm) of the fixed shaft has been set so as to satisfy the relation of $\alpha^3 \cdot M1 > d^3 > M1$.

Also, according to the motor of the present invention, there is provided a shaft-rotating type motor of the fluid bearing specifications, wherein the diameter d (mm) of the fixed shaft has been set so as to satisfy the relation of $\alpha^3 \cdot M2 > d^3 > M2$.

Where in $M1 = J1 \cdot (N/1000)^2 \cdot k^2 \cdot D$ and $M2 = J2 \cdot (N/1000)^2 \cdot k^2 \cdot D$, J1 and J2 are coefficients to be experimentally determined. N(rpm) is a service number of revolutions, k is a number of disk-shaped recording media, D (inch) is a diameter of the disk-shaped recording medium, and α is a ratio of the maximum diameter to the minimum diameter of the fixed shaft or the rotor shaft.

According to the present invention, the reduction of loss as far as possible, the minimum vibration proof performance and the reliability can be obtained.

According to a motor specified in a first embodiment of the present invention, there is provided a motor having a magnet provided for a rotor rotatably supported by a fixed shaft and a stator winding mounted on a stator core to face the foregoing magnet, for rotationally driving a disk-shaped recording medium placed on the foregoing rotor around its shaft center, wherein when the diameter of the fixed shaft is d (mm), the service number of revolutions is N (rpm), the number of the disk-shaped recording media is k, and the diameter of the disk-shaped recording medium is D (inch), the following relation has been set:

$$\alpha^3 \cdot M1 > d^3 > M1$$

where $M1 = J1 \cdot (N/1000)^2 \cdot k^2 \cdot D$, J1 being a coefficient to be experimentally determined and set to be 0.018±20%, and α being a ratio of the maximum diameter to the minimum diameter of the fixed shaft.

According to a motor specified in a second embodiment of the present invention, there is provided a motor having a main magnet provided for a rotor rotatably supported by inserting a rotor shaft into the shaft hole in the fixed sleeve formed on the stator side, and a stator core mounted on the stator side to face the foregoing main magnet, for rotationally driving a disk-shaped recording medium placed on the foregoing rotor around its shaft center, wherein when the diameter of the foregoing rotor shaft is d (mm), the service number of revolutions is N (rpm), the number of the disk-shaped recording media is k, and the diameter of the disk-shaped recording medium is D (inch), the following relation has been set:

$$\alpha^3 \cdot M2 > d^3 > M2,$$

where $M2 = J2 \cdot (N/1000)^2 \cdot k^2 \cdot D$, J2 being a coefficient to be experimentally determined and set to 0.0134±20%, and α being a ratio of the maximum diameter to the minimum diameter of the rotor shaft.

A hard disk drive specified in a third embodiment of the present invention incorporates a motor described in either the first or second embodiments therein, and is characterized in that this motor rotationally drives a disk-shaped recording medium.

DESCRIPTION OF THE EMBODIMENTS

Hereinafter, with reference to FIGS. 1 to 14, the description will be made of each embodiment according to the present invention.

First Embodiment

FIGS. 1 to 10 show a First Embodiment.

Figure 1:
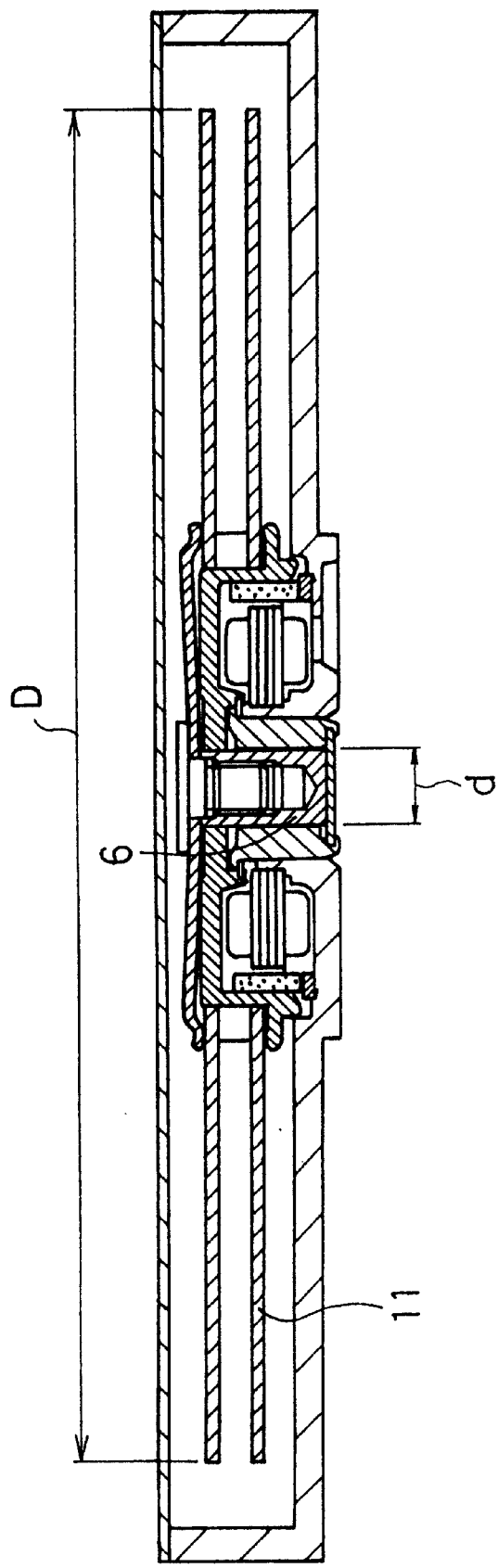
FIG. 1 is a sectional view showing a hard disk drive using a shaft-rotating type motor.
Figure 2:
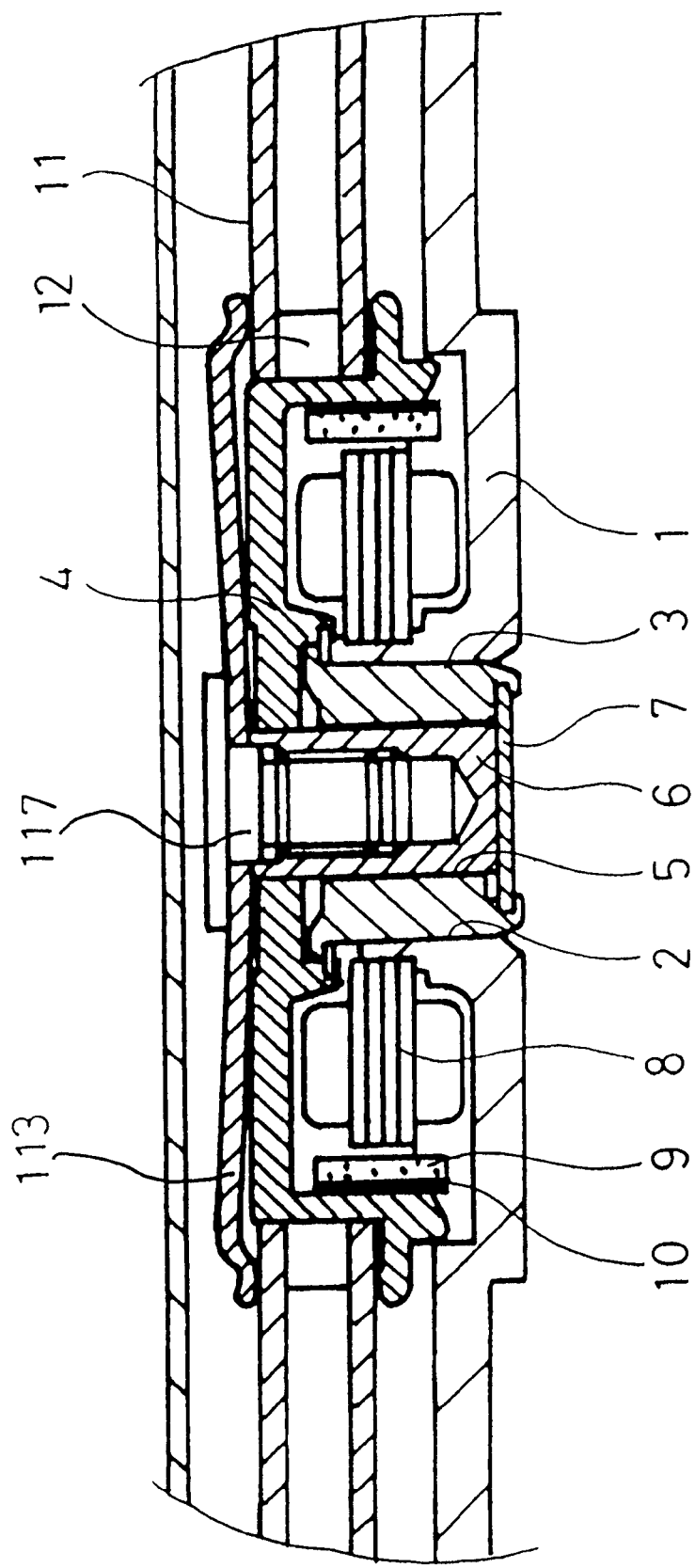
FIG. 2 is an enlarged view showing essential portions of FIG. 1.

FIGS. 1 and 2 show a hard disk drive using a shaft-rotating type motor of the fluid bearing specifications, and a fixed sleeve 3 is mounted on a central hole 2 in a bracket 1. A rotor shaft 6, which is inserted into a shaft hole 5 of the fixed sleeve 3, is mounted to a hub 4, and the tip end of the rotor shaft 6 inserted into the fixed sleeve 3 abuts upon a thrust plate 7 mounted on the proximal end of the fixed sleeve 3. in the bracket 1. A stator core 8 is mounted with the foregoing fixed sleeve 3 placed at the center so that the tip end of the yoke is placed on the outer periphery side of the stator core 8.

On the hub 4, there is mounted an annular main magnet 9 through a frame 10 to face the outer peripheral portion of this stator core 8. In this respect, there is formed a radial dynamic pressure generating portion between the fixed sleeve 3 and the rotor shaft 6, and the clearance is filled with lubricating fluid.

In these FIGS. 1 and 2, two hard disks 11 are mounted on the hub 4 and retained by a clamp ring 113 and a screw 117 with a spacer 112 interposed between the disks.

Figure 3:
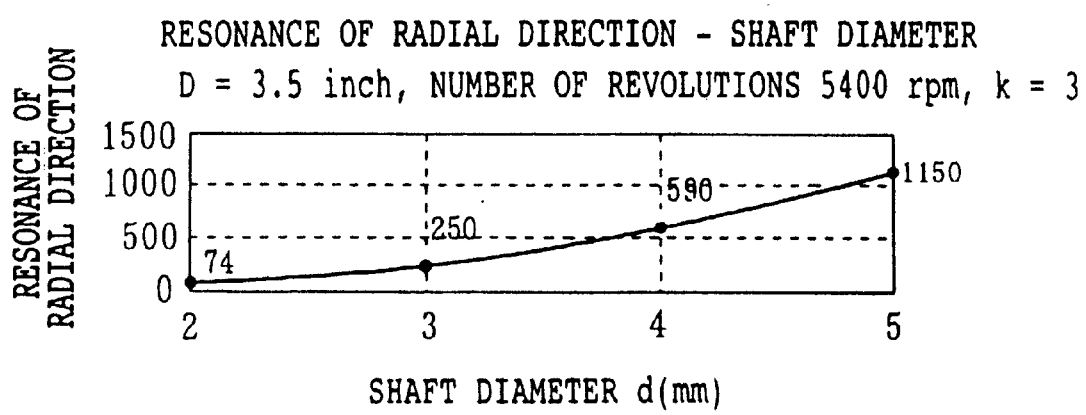
FIG. 3 shows the relation between a shaft diameter and a resonance of radial direction according to a first embodiment of the present invention.

Assuming that the diameter of the rotor shaft 6 is d (mm), the service number of revolutions N is 5400 (rpm), and the number of the disk-shaped recording media k is 3, and the diameter of the disk-shaped recording medium D is 3.5 (inch), when the relation between the diameter d of the rotor shaft 6 and the resonance frequency of radial direction f was measured with the diameter d of the rotor shaft 6 as a variable, there existed such a relation of $f \, d^3$ as shown in FIG. 3.

Figure 4:
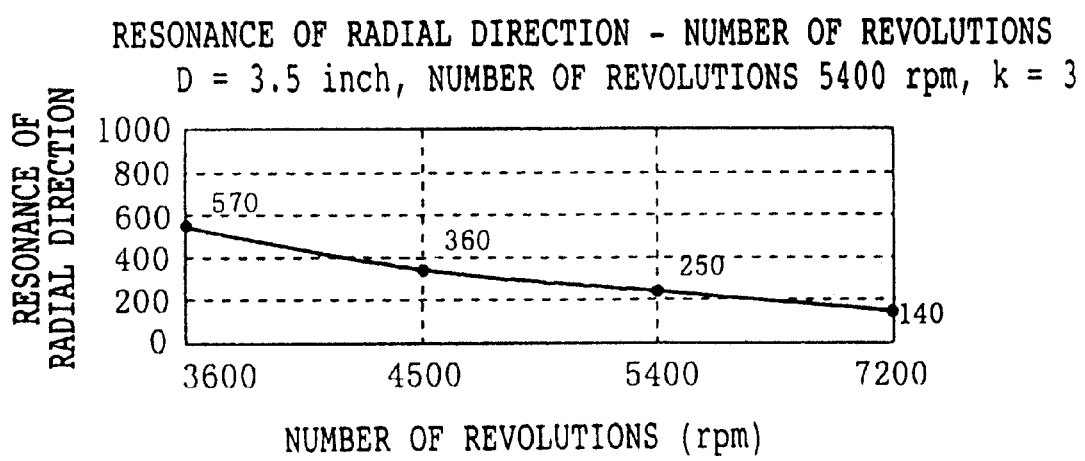
FIG. 4 shows the relation between the number of revolutions and the resonance of radial direction according to the first embodiment of the present invention.

Also, when the relation between it and the resonance frequency of radial direction f was measured, with the service number of revolutions N as a variable, there existed such a relation of $f \, 1/N^2$ as shown in FIG. 4.

Figure 5:
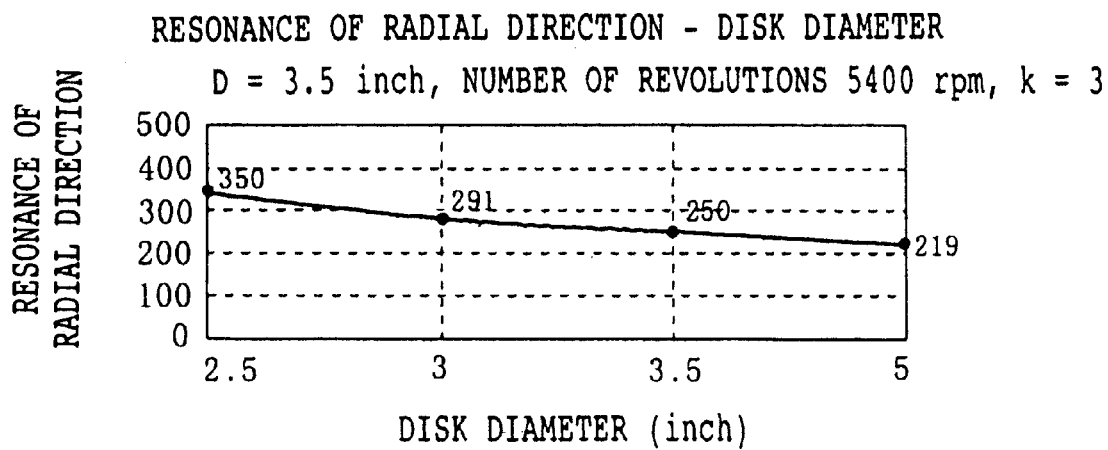
FIG. 5 shows the relation between a disk diameter and the resonance of radial direction according to the first embodiment of the present invention.

Also, when the relation between it and the resonance frequency of radial direction f was measured, with the diameter D of the disk-shaped recording medium as a variable, there existed such a relation of $f \, 1/D$ as shown in FIG. 5.

Figure 6:
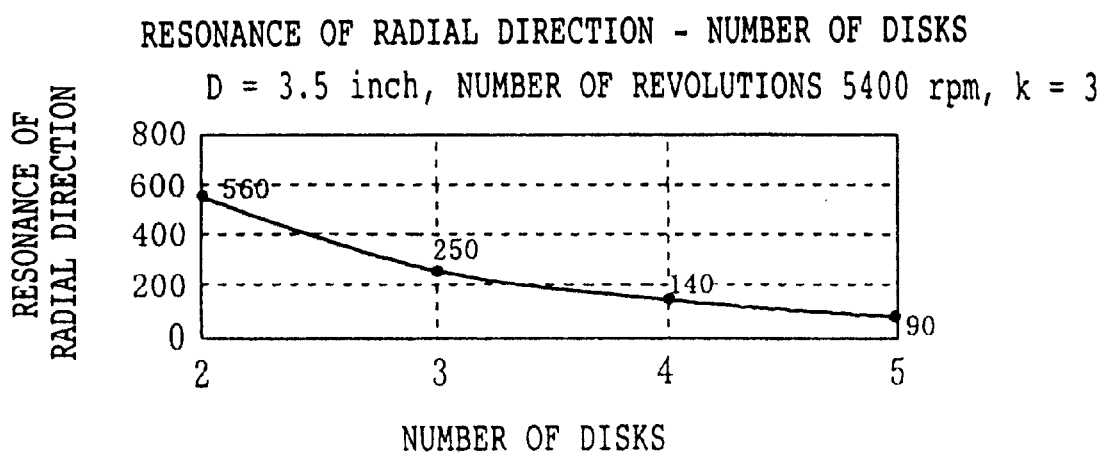
FIG. 6 shows the relation between the number of disks and the resonance of radial direction according to the first embodiment of the present invention.

Also, when the relation between it and the resonance frequency of radial direction f was measured, with the number k of the disk-shaped recording medium as a variable, there existed such a relation of $f \, 1/k^2$ as shown in FIG. 6.

Therefore, from the results of FIGS. 3 to 6, the resonance frequency of radial direction f can be expressed as follows:

$$f \, d^3 \cdot 1/N^2 \cdot 1/D \cdot 1/k^2$$

Figure 7:
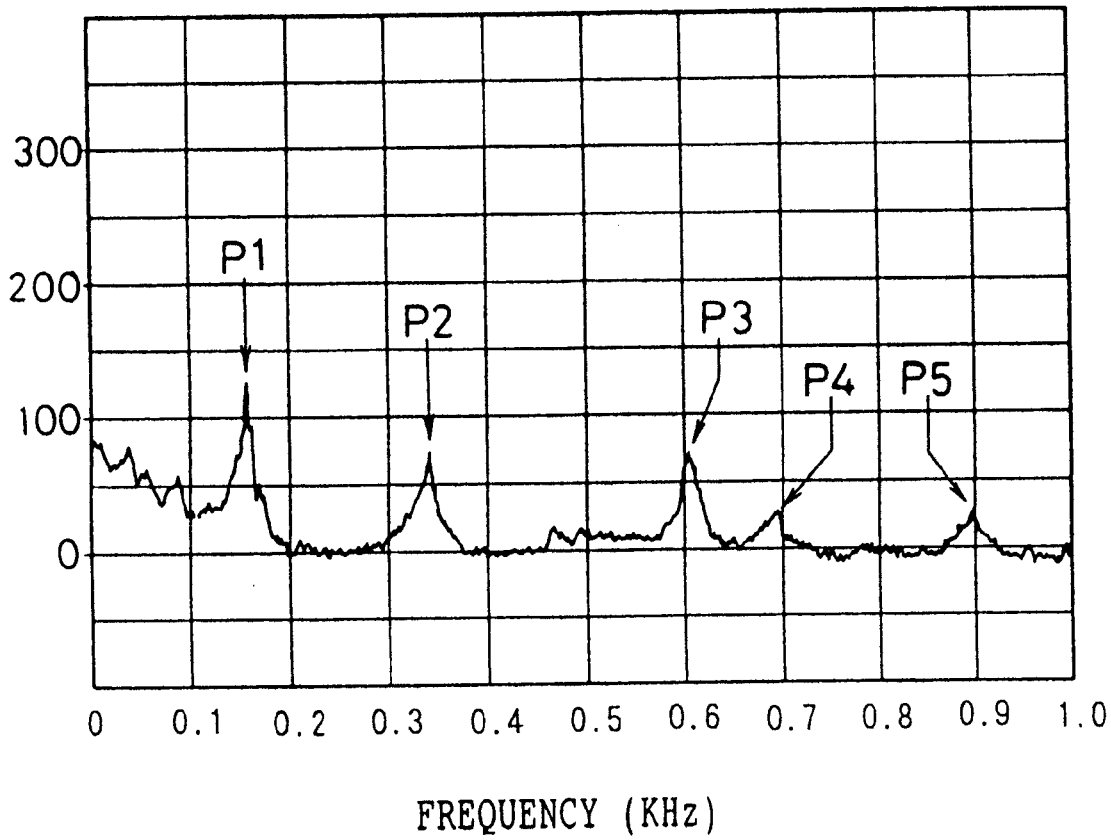
FIG. 7 shows vibration proof characteristics before the shaft diameter is made larger.

A shaft-rotating type motor of the fluid bearing specifications was caused to rotate a drive mounted with three 3.5-inch disks at 5400 rpm, and an axial displacement on the disk surface when this drive was excited at 0.5G was measured with the result shown in FIG. 7.

The vibration proof performance is evaluated at the occurrence level for resonance at several hundreds or less Hz including the disks. In FIG. 7, a level at which no operation error occurs during excitation is regarded as 100 for display.

Figure 8:
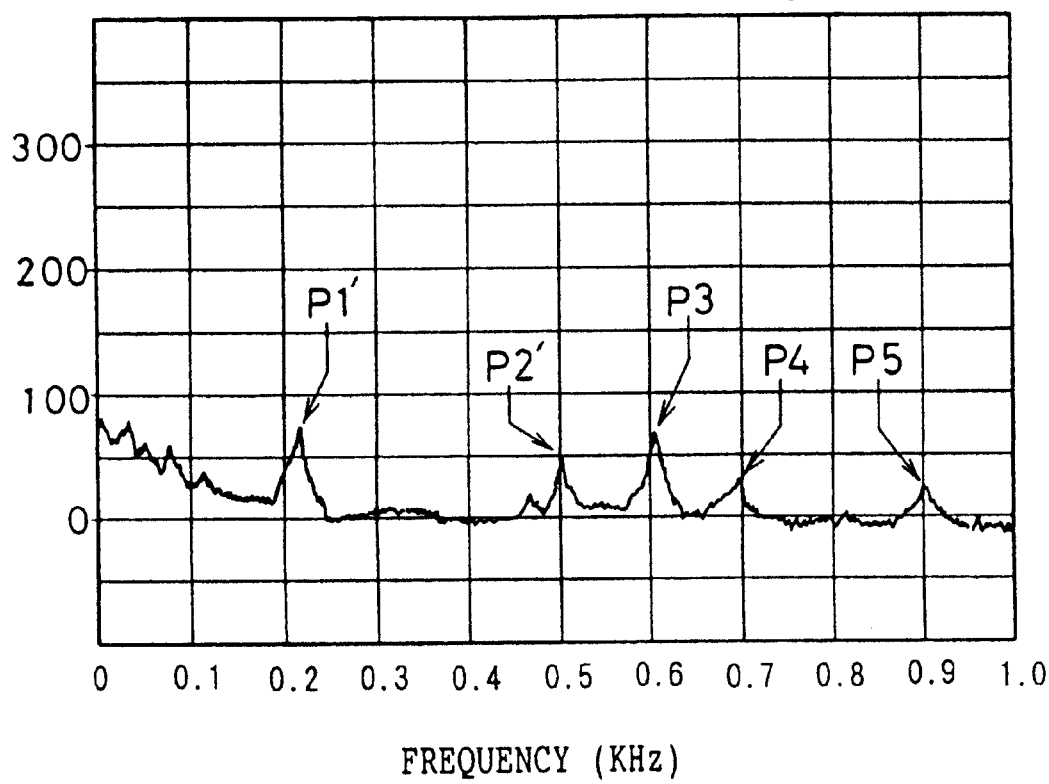
FIG. 8 shows vibration proof characteristics after the shaft diameter is made larger as countermeasure.

The diameter d of the rotor shaft 6 of the shaft-rotating type motor measured in FIG. 8 is larger than that of the shaft-rotating type motor measured in FIG. 7.

As apparent from the comparison between FIGS. 7 and 8, a peak P1 near 160 Hz which has occurred in the low area in FIG. 7 and a peak P2 near 365 Hz have moved near 220 Hz and near 500 Hz respectively as indicated by peaks P1' and P2' in FIG. 8 in which the diameter d of the rotor shaft 6 was made larger.

These peaks P1, P2, P1' and P2' show resonance which depends upon a stiffness value represented by the diameter of the rotor shaft 6 or the like, and the resonance is called "resonance of radial direction". The resonance is divided into two by a gyroscopic effect; peak P1 or P1' is called a "reverse direction revolution mode" and peak P2 or P2', is called a "motor-rotating direction mode".

Peak P3 indicates resonance of the disk packaged. Peaks P4 and P5 are factors due to another resonance.

All the vibrations which occur do not always pose a problem, but components 300 Hz or less usually pose a problem in general because there is compression due to a servo.

In this area, peaks P1, P1', P2 and P2' which are called "resonance of radial direction" significantly affect in the problems relating to servo of the drive, and occurrences of errors;

Assuming the number of revolutions N of the motor, the number k of disks and the shaft diameter d as parameters, the excitation acceleration at which the drive does not cause any errors was experimentally determined. The following (Table 1) is the results.

TABLE 1

| NUMBER OF REVOLUTIONS | NUMBER OF | SHAFT DIAMETER (mm) | | | |
|---|---|---|---|---|---|
| rpm | DISKS | 3 | 3.5 | 4.0 | 5.0 |
| 5400 | 3 | 1.09G | 1.74G | 2.60G | 5.08G |
|  | 4 | 0.61 | 1.13 | 1.46 | 3.30 |
|  | 5 | 0.31 | 0.65 | 0.76 | 1.90 |

From this (Table 1), the excitation acceleration at which any errors are not caused when the number of revolutions is N=5400 rpm, the number of disks is k=3 and the shaft diameter is d=3.5 mm, is 1.74 G, and when the target excitation acceleration required as a product is assumed as G, it can be expressed as follows:

$$(3/k)^2(d/3.5)^3/(N/5400)^2/(D/3.5)=(G_0/1.74)$$

$$(3/k)^2(d/3.5)^3/(N/5400)^2/(D/3.5)\cdot1.74=G_0$$

When the minimum required shaft diameter d at the target excitation acceleration $G_0=0.5G$ is determined by the proportional calculation from the foregoing, we get:

$$(3/k)^2(d/3.5)^3/(N/5400)^2/(D/3.5)\cdot1.74=0.5$$

$$d^3=0.0134\cdot(N/1000)^2\cdot k^2\times D$$

When the maximum shaft diameter is set to 1.5 times as large as the minimum shaft diameter from two viewpoints: how a margin is left for the upper limit for the shaft diameter d, and the allowable level is set to about twice as much as the loss at the minimum shaft diameter or less because the bearing loss is substantially proportional to a square of the shaft diameter, the maximum shaft diameter is defined to be as follows:

$$d^3=0.0134\cdot(N/1000)^2\cdot k^2\cdot D\cdot1.5^3$$

The setting range for the shaft diameter d can be expressed as follows:

$$0.0134\cdot(N/1000)^2\cdot k^2\cdot D<d^3<0.0134\cdot(N/1000)^2\cdot k^2\cdot D\cdot1.5^3$$

On the basis of this relational expression, it was confirmed whether the target excitation acceleration $G_0=0.5G$ is satisfied by changing the number of revolutions of the motor, the number of disks, and the disk diameter, on the basis of which the shaft diameter d was set, but any of the motors was appropriate. The coefficient of 0.0134 satisfied the target excitation acceleration $G_0$ within a range of 0.0134±20%.

Figure 9:
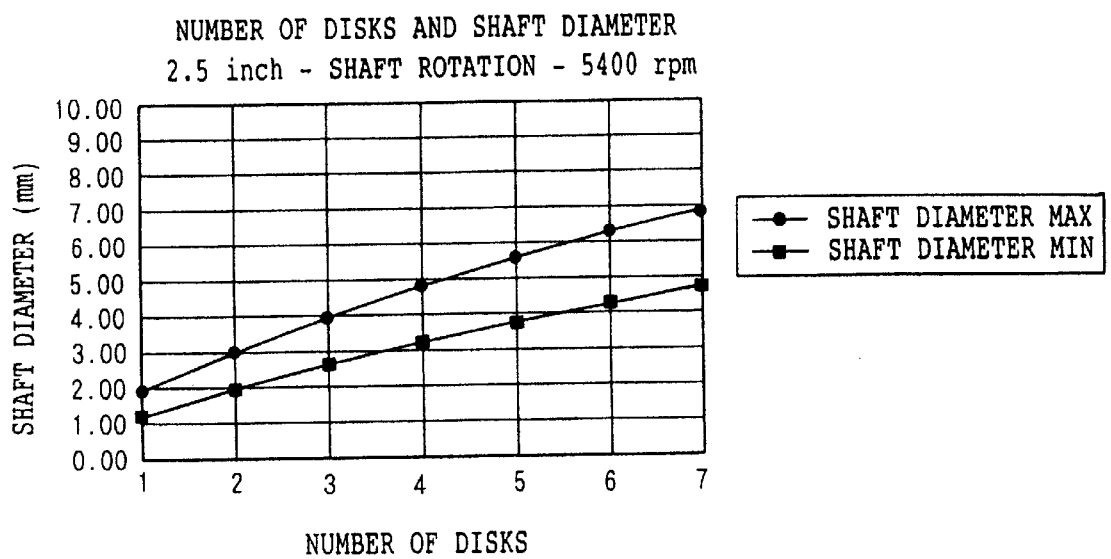
FIG. 9 shows the relation between the number of disks and the shaft diameter, indicating a range for the shaft diameter of a shaft-rotating type motor with a number of revolutions of 5400 rpm.
Figure 10:
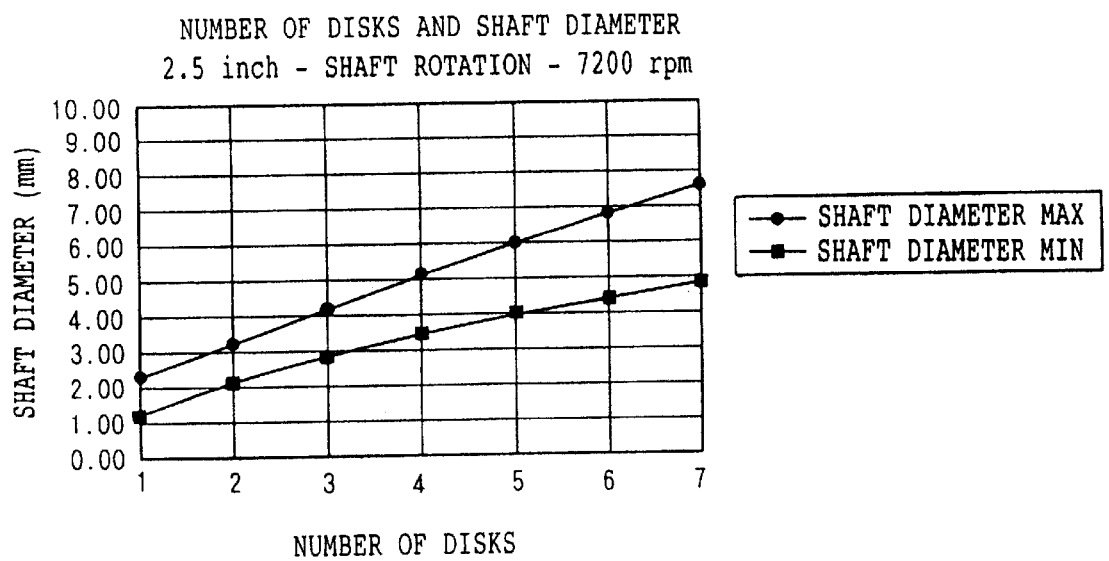
FIG. 10 shows the relation between the number of disks and the shaft diameter, indicating a specific range for the shaft diameter of a shaft-rotating type motor with a number of revolutions of 7200 rpm.

Specifically, FIG. 9 represents the minimum and maximum values for the shaft diameter which satisfy the target excitation acceleration $G_0=0.5G$ by changing the number of the disks when a motor mounted with 2.5 inch disks is rotated at 5400 rpm. FIG. 10 represents the minimum and maximum values for the shaft diameter which satisfy the target excitation acceleration $G_0=0.5G$ by changing the number of the disks when a motor mounted with 2.5 inch disks is rotated at 7200 rpm.

Second Embodiment

FIGS. 11 to 14 show a (Second Embodiment).

Figure 11:
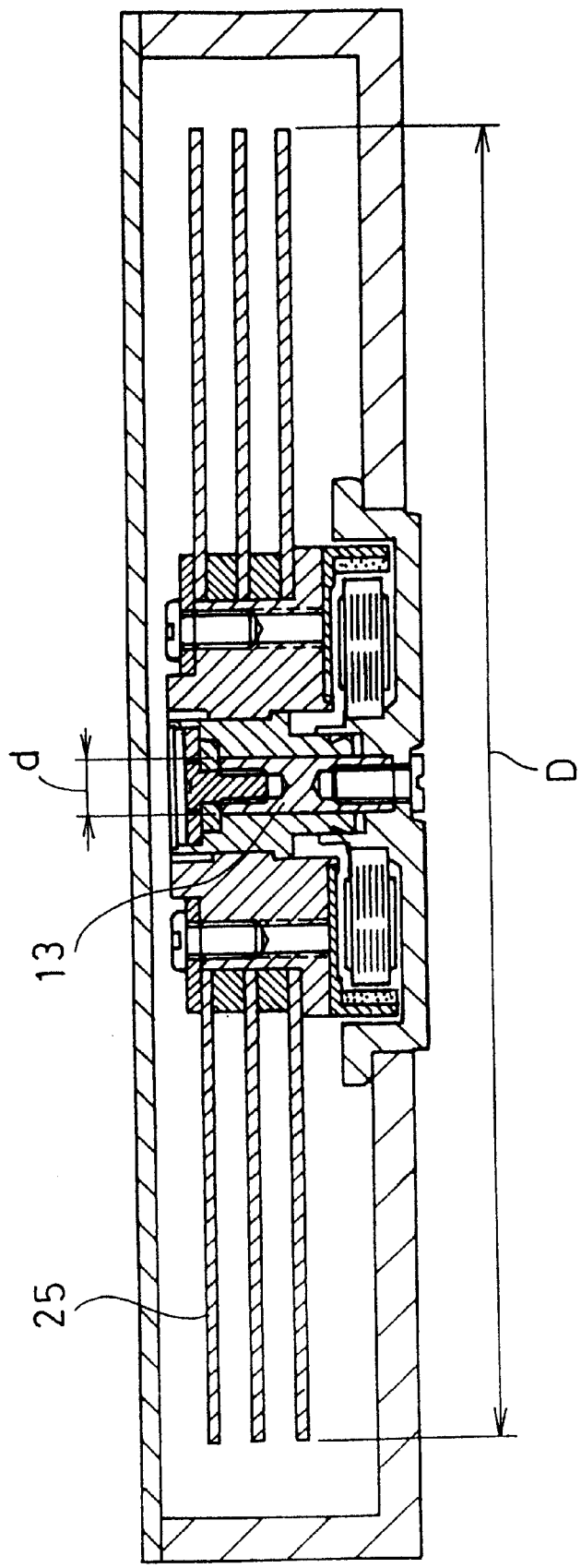
FIG. 11 is a sectional view showing a hard disk drive using a shaft-fixed type motor.
Figure 12:
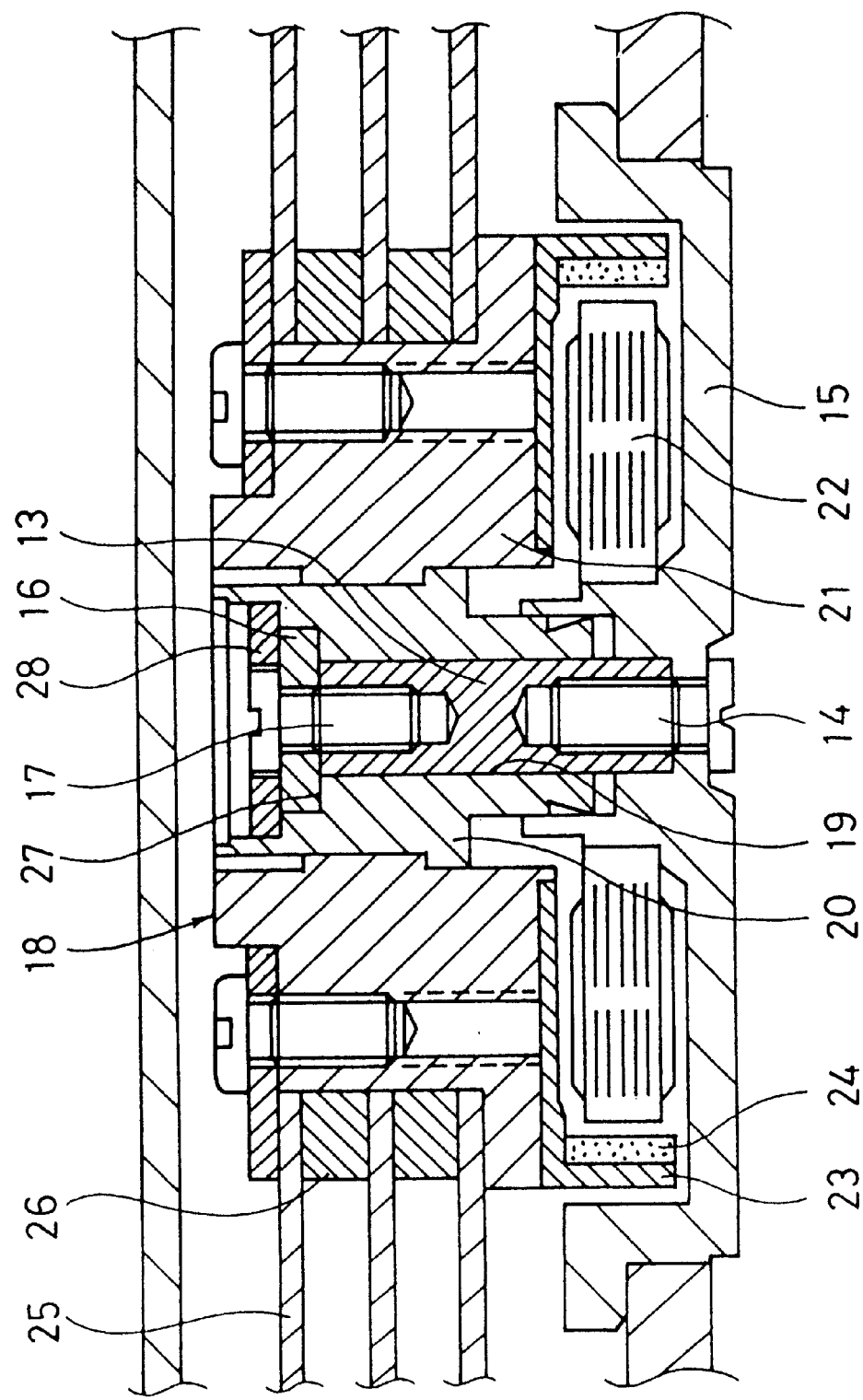
FIG. 12 is an enlarged view showing essential portions of FIG. 11.

FIGS. 11 and 12 show a hard disk drive using a shaft-fixed type motor of the fluid bearing specifications, and the proximal end of a fixed shaft 13 is fixed to a lower case 15 with a screw 14. A fixed thrust plate 16 is mounted to the tip end of the fixed shaft 13 with a screw 17.

A rotary sleeve 18, which is rotatable with respect to the fixed shaft 13, consists of a barrel portion 20 having a shaft hole 19 into which the foregoing fixed shaft 13 is inserted, and a hub portion 21 projecting from the tip end of the barrel portion 20 outwardly.

A stator core 22 is mounted to the lower case 15 with the tip end of the yoke placed on the outside.

The foregoing hub portion 21 integrally mounted on the tip end of the barrel portion 20 of the rotary sleeve 18 is mounted with an annular magnet 24 through a rotor frame 23. In these FIGS. 11 and 12, three hard disks 25 are mounted on the hub portion 21 with spacers 26 interposed therebetween.

A radial dynamic pressure generating portion is formed between the fixed shaft 13 and the inner peripheral surface of the barrel portion 20, and a thrust dynamic pressure generating portion is formed between the fixed thrust plate 16, a concave portion 27 in the rotary sleeve 18, and a rotary thrust plate 28.

In the radial dynamic pressure generating portion, a dynamic pressure generating groove is formed on the outer peripheral surface of the fixed shaft 13, and the clearance is filled with lubricating fluid. In the thrust dynamic pressure generating portion, dynamic pressure generating grooves are formed on the upper surface and on the lower surface of the fixed thrust plate 16 respectively, and the clearances are filled with lubricating fluid.

In the case of this (Second Embodiment) shaft-fixed type, the excitation acceleration at which the drive does not cause any errors was experimentally obtained assuming the number of revolutions N of the motor, the number k of the disks and the shaft diameter d as parameters, similarly as in the case of the Table 1 (of the First Embodiment). The following (Table 2) shows the results.

TABLE 2

| NUMBER OF REVOLUTIONS | NUMBER OF | SHAFT DIAMETER (mm) | | | |
|---|---|---|---|---|---|
| rpm | DISKS | 3 | 3.5 | 4.0 | 5.0 |
| 5400 | 3 | 0.80G | 1.28G | 1.90G | 3.73G |
|  | 4 | 0.45 | 0.83 | 1.07 | 2.43 |
|  | 5 | 0.23 | 0.48 | 0.56 | 1.40 |
| 7200 | 3 | 0.45 | 0.72 | 1.07 | 2.10 |
|  | 4 | 0.25 | 0.47 | 0.60 | 1.37 |
|  | 5 | 0.13 | 0.27 | 0.31 | 0.79 |
| 10000 | 3 | 0.13 | 0.21 | 0.31 | 0.61 |
|  | 4 | 0.07 | 0.14 | 0.17 | 0.40 |
|  | 5 | 0.04 | 0.08 | 0.09 | 0.23 |

From this (Table 2), the excitation acceleration at which errors are not caused when the number of revolutions is N=5400 rpm, the number of disks is k=3 and the shaft diameter is d=3.5 mm, is 1.28 G, and when the target excitation acceleration required as a product is assumed as $G_0$, it can be expressed as follows:

$$(3/k)^2(d/3.5)^3/(N/5400)^2/(D/3.5)=(G_0/1.28)$$

$$(3/k)^2(d/3.5)^3/(N/5400)^2/(D/3.5)\cdot1.28=G_0$$

When the minimum required shaft diameter d at the target excitation acceleration $G_0=0.5G$ is determined by proportional calculation from the foregoing, we get:

$$(3/k)^2(d/3.5)^3/(N/5400)^2/(D/3.5)\cdot1.28=0.5$$

$$d^3=0.018 \cdot (N/1000)^2 \cdot k^2 \cdot D$$

When the maximum shaft diameter is set to 1.5 times as large as the minimum shaft diameter from two viewpoints: that is, how a margin is left for the upper limit of the shaft diameter d, and the allowable level is set to about twice as much as the loss at the minimum shaft diameter or less because the bearing loss is substantially proportional to a square of the shaft diameter, the maximum shaft diameter is defined to be as follows:

$$d^3=0.018 \cdot (N/1000)^2 \cdot k^2 \cdot D \cdot 1.5^3$$

The setting range for the shaft diameter d can be expressed as follows:

$$0.018 \cdot (N/1000)^2 \cdot k^2 \cdot D < d^3 < 0.018 \cdot (N/1000)^2 \cdot k^2 \cdot D \cdot 1.5^3$$

On the basis of this relational expression, it was confirmed whether the target excitation acceleration $G_0=0.5G$ is satisfied by changing the number of revolutions of the motor, the number of the disks, and the disk diameter, on the basis of which the shaft diameter d was set, but any of the motors was appropriate. The coefficient of 0.018 satisfied the target excitation acceleration $G_0$ within a range of 0.018±20%.

Figure 13:
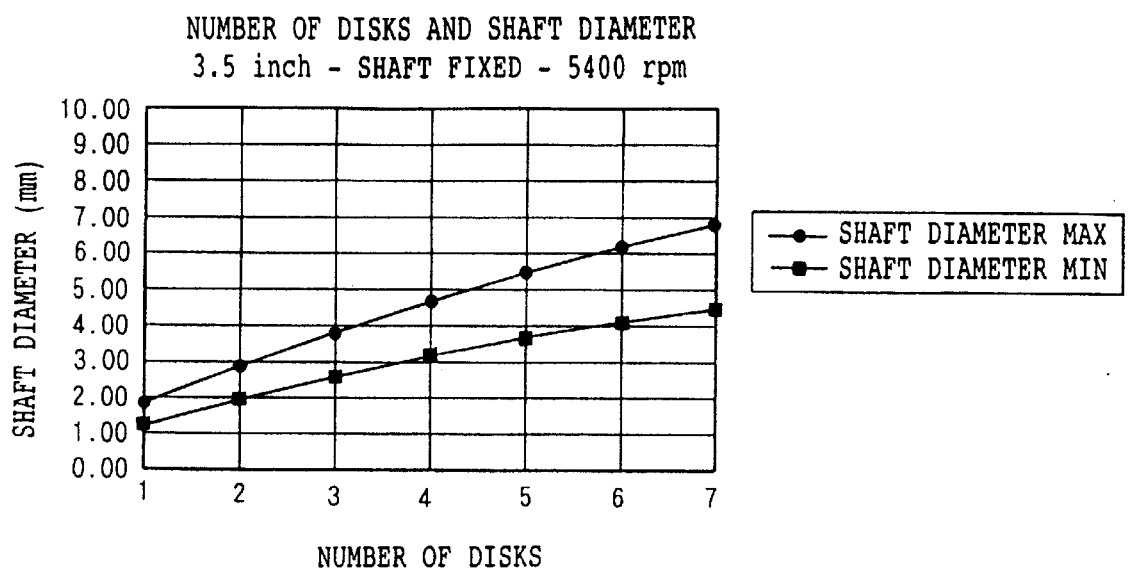
FIG. 13 shows the relation between the number of disks and the shaft diameter, indicating a range for the shaft diameter of a shaft-fixed type motor with a number of revolutions of 5400 rpm.
Figure 14:
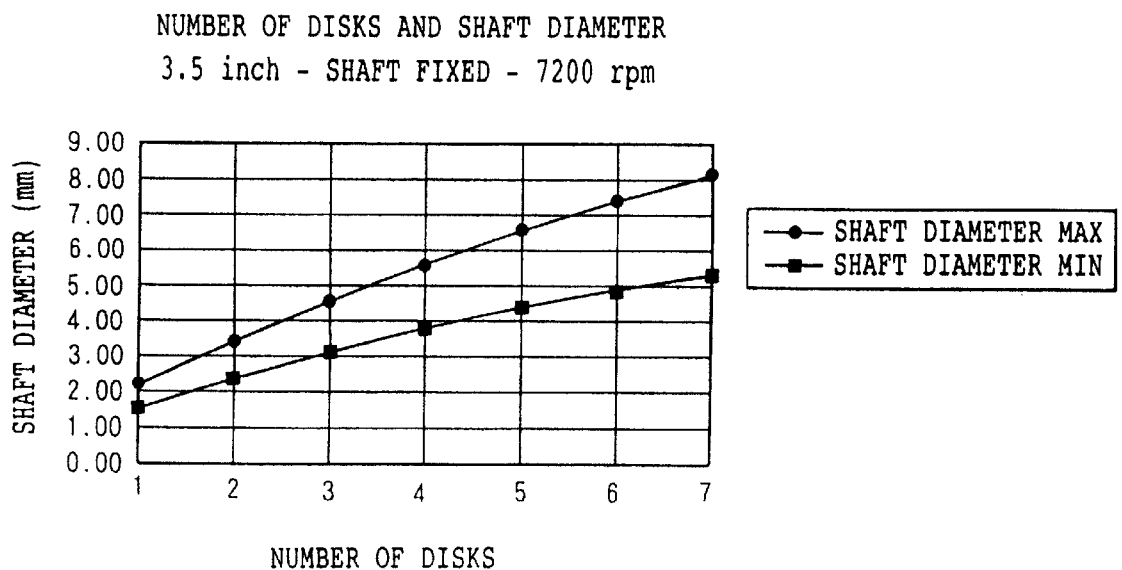
FIG. 14 shows the relation between the number of disks and the shaft diameter, indicating a specific range for the shaft diameter of a shaft-fixed type motor with a number of revolutions of 7200 rpm.
Figure 15:
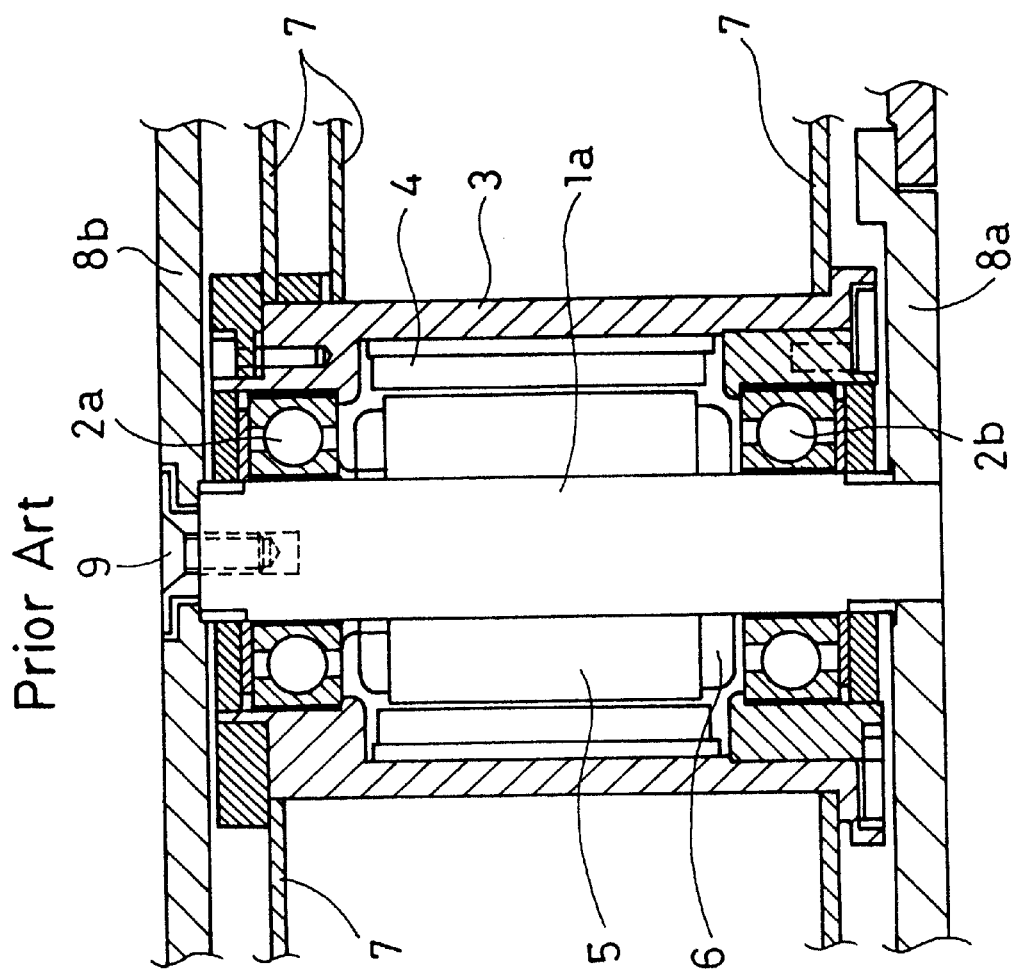
FIG. 15 is a sectional view showing a shaft-fixed type motor of the bearing specifications.

Specifically, FIG. 13 represents the minimum and maximum values for the shaft diameter which satisfy the target excitation acceleration $G_0=0.5G$ by changing the number of the disks when a motor mounted with 3.5 inch disks is rotated at 5400 rpm. FIG. 14 represents the minimum and maximum values for the shaft diameter which satisfy the target excitation acceleration $G_0=0.5G$ by changing the number of the disks when a motor mounted with 3.5 inch disks is rotated at 7200 rpm.

As described above, the motor according to the present invention is capable of reducing the loss as much as possible, and securing the minimum vibration proof performance and reliability in the fluid bearing specifications because the motor is set to an appropriate shaft diameter in conformity with the conditions for use.

Also, the hard disk drive loaded with this motor is capable of reducing the power consumption without sacrificing any reliability.

What is claimed is:

1. A motor having a magnet provided on a rotor rotatably supported on a fixed shaft by a rotary sleeve via a fluid bearing and a stator winding mounted to a stator core facing said magnet, said motor for rotationally driving a disk-shaped recording medium placed on said rotor around the shaft axis wherein the diameter of said fixed shaft is d (mm) which is within a maximum diameter and a minimum diameter, the service number of revolutions is N (rpm), the number of said disk-shaped recording media is k, and the diameter of said disk-shaped recording medium is D (inch), and the following relation is satisfied:

$$\alpha^3 \cdot M1 > d^3 > M1$$

where $M1=J1 \cdot (N/1000)^2 \cdot k^2 \cdot D$, J1 being a coefficient between 0.018±20%, and $\alpha$ equaling a ratio of the maximum diameter to the minimum diameter of said fixed shaft.

2. A hard disk drive incorporating a motor defined in claim 1 and for rotationally driving a disk-shaped recording medium.

3. A motor having a main magnet provided on a rotor rotatably supported by inserting a rotor shaft into a shaft hole in a fixed sleeve formed on a stator side, and a stator core mounted on the stator side facing said main magnet, said motor for rotationally driving a disk-shaped recording medium mounted on said rotor around the shaft axis with a fluid bearing between said rotor shaft and said fixed sleeve wherein the diameter of said rotor shaft is d (mm) which is within a maximum diameter and a minimum diameter, the service number between revolutions is N (rpm), the number of said disk-shaped recording media is k, and the diameter of said disk-shaped recording medium is D (inch), and the following relation is satisfied:

$$\alpha^3 \cdot M2 > d^3 > M2$$

where $M2=J2 \cdot (N/1000)^2 \cdot k^2 \cdot D$, J2 being a coefficient between 0.0134±20%, and $\alpha$ equaling a ratio of the maximum diameter to the minimum diameter of said shaft.

4. A hard disk drive incorporating a motor defined in claim 2, and for rotationally driving a disk-shaped recording medium.

5. A hard disk drive incorporating a motor defined in claim 2, and further comprising a center clamping device for mounting said motor on said rotor.

* * * * *